United States Patent
Luo et al.

(10) Patent No.: US 10,067,753 B2
(45) Date of Patent: Sep. 4, 2018

(54) APPLICATION PROGRAM UNINSTALLATION METHOD AND APPARATUS

(71) Applicant: Beijing Kingsoft Internet Security Software Co Ltd, Beijing (CN)

(72) Inventors: Fan Luo, Beijing (CN); Jiabo Zhou, Beijing (CN); Lidong Zhang, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 0 days.

(21) Appl. No.: 15/325,049

(22) PCT Filed: Jun. 23, 2015

(86) PCT No.: PCT/CN2015/082118
§ 371 (c)(1),
(2) Date: Jan. 9, 2017

(87) PCT Pub. No.: WO2016/011862
PCT Pub. Date: Jan. 28, 2016

(65) Prior Publication Data
US 2017/0185388 A1    Jun. 29, 2017

(30) Foreign Application Priority Data
Jul. 21, 2014  (CN) .......................... 2014 1 0347400

(51) Int. Cl.
*G06F 9/445*    (2018.01)
*G06F 9/44*    (2018.01)
(Continued)

(52) U.S. Cl.
CPC .......... *G06F 8/62* (2013.01); *G06F 17/30117* (2013.01)

(58) Field of Classification Search
CPC . G06F 8/61; G06F 8/62; G06F 3/0652; G06F 17/30117; G06F 8/65; G06F 8/60; G06F 8/70; G06F 8/71
See application file for complete search history.

(56) References Cited

U.S. PATENT DOCUMENTS 8,499,063 B1 * 7/2013 Satish .................. G06F 8/62
709/220
9,471,297 B2 * 10/2016 Hogan .............. G06F 17/30477
(Continued)

FOREIGN PATENT DOCUMENTS

CN    101515238 A    8/2009
CN    101989211 A    3/2011
(Continued)

OTHER PUBLICATIONS

Zhang et al., "Life after App Uninstallation: Are the Data Still Alive? Data Residue Attacks on Android", Feb. 2016, pp. 16, retrieved from <https://xzhang35.expressions.syr.edu/wp-content/uploads/2015/10/android_data_residue.pdf> (Year: 2016).*
(Continued)

*Primary Examiner* — Marina Lee
(74) *Attorney, Agent, or Firm* — Squire Patton Boggs (US) LLP

(57) ABSTRACT

Embodiments of the present application provide an application program uninstallation method and apparatus. The method comprises: receiving an uninstallation instruction for a target application program (S101); deleting a specific directory in a local device to which the target application program corresponds, according to the received uninstallation instruction (S102); extracting an identifier of the target application program (S103); searching a local pre-set directory residual database to determine whether there exist any directory data that correspond to the identifier (S104), the directory data comprising at least a directory path; if such
(Continued)

directory data exist, deleting a directory in the local device to which the directory path found corresponds, according to the search result (S105). By applying the embodiments of the present application, when the specific directory corresponding to the uninstalled application program is deleted, other directories, other than the specific directory, to which the uninstalled application program corresponds are also deleted, so that after the uninstall of the application program is completed, file residue is avoided, and the occupation of the device storage space is reduced.

18 Claims, 9 Drawing Sheets

(51) Int. Cl.
  *G06F 8/61* (2018.01)
  *G06F 17/30* (2006.01)

(56) References Cited

U.S. PATENT DOCUMENTS

| | | | | |
|---|---|---|---|---|
| 2004/0060045 | A1* | 3/2004 | Hind | G06F 8/62 717/174 |
| 2006/0048129 | A1* | 3/2006 | Napier | G06F 8/62 717/168 |
| 2007/0028231 | A1* | 2/2007 | Kelso | G06F 8/62 717/174 |
| 2007/0073792 | A1* | 3/2007 | Nichols | G06F 17/30117 |
| 2008/0134347 | A1* | 6/2008 | Goyal | G06F 21/6209 726/29 |
| 2013/0227085 | A1* | 8/2013 | Choi | H04L 67/1095 709/219 |
| 2014/0067879 | A1* | 3/2014 | Ahn | G06F 17/30312 707/812 |
| 2014/0282460 | A1* | 9/2014 | Cai | G06F 8/62 717/168 |
| 2014/0365451 | A1* | 12/2014 | Chen | G06F 17/30117 707/692 |
| 2017/0185388 | A1* | 6/2017 | Luo | G06F 8/62 |

FOREIGN PATENT DOCUMENTS

| | | |
|---|---|---|
| CN | 102662667 A | 9/2012 |
| CN | 103176828 A | 6/2013 |
| CN | 103500116 A | 1/2014 |
| CN | 103559276 A | 2/2014 |
| CN | 104102516 A | 10/2014 |

OTHER PUBLICATIONS

International Search Report for Application No. PCT/CN2015/082118, dated Sep. 29, 2015, English translation, 3 pp.

* cited by examiner

APPLICATION PROGRAM UNINSTALLATION METHOD AND APPARATUS

The present application claims priority to Chinese Patent Application No. 201410347400.X, entitled "Application Program Uninstallation Method and Apparatus" filed with the Chinese Patent Office on Jul. 21, 2014, which is hereby incorporated into the present application by reference in its entirety.

TECHNICAL FIELD

The present application relates to the field of managing application programs of an electronic device, particularly to an application program uninstall method and apparatus.

BACKGROUND

With the development of electronic devices, in order to meet the requirements of a user for shopping, social contact, entertainment and the like, a growing number of application programs are developed for a user to use in electronic devices.

Usually, a user installs an application program in a specific directory of a local electronic device, and stores downloaded data files or some generated local record files and the like in a specific directory. For example, an application program is installed in a directory of "/data/application program name" or in a directory of "/sdcard/data/application program name", wherein the above-mentioned files are also stored in the both directories. In some circumstances, however, an application program is installed in a specific directory of a local device, while the above-mentioned files are stored in other directories other than the specific one, for example, an application program developer develops the application programs without following the related protocols or specifications, resulting in that the directories for storing files of the application programs are not the specific directories.

In the case that the above-mentioned files are stored in a directory other than the specific one, since a system can only identify the specific directory when uninstalling an application program, only the specific directory that corresponds to the uninstalled application program will be deleted, and other directories, other than the specific directory, for storing files will not be deleted, which causes residues of files stored in other directories other than the specific directory, thereby occupying the device storage space.

SUMMARY OF THE INVENTION

The object of embodiments of the present application is to provide an application program uninstallation method and apparatus, such that files residue is avoided after the uninstallation of an application program is completed, and the occupation of the device storage space is reduced.

In order to achieve the above object, embodiments of the present application disclose an application uninstallation method, which is to be applied to an electronic device. The method comprises:

receiving an uninstallation instruction for a target application program;

deleting a specific directory in a local device to which the target application program corresponds, according to the received uninstallation instruction;

extracting an identifier of the target application program;

searching a local pre-set directory residual database to determine whether there exist any directory data that correspond to the identifier, the directory data comprising at least a directory path;

if yes, deleting a directory in the local device to which the directory path found corresponds, according to the search result.

Preferably, the step of deleting a directory in the local device to which the directory path found corresponds according to the search result comprises:

determining whether there exists a directory in the local device to which the directory path found corresponds;

if yes, deleting the directory in the local device to which the directory path found corresponds.

Preferably, the step of deleting a directory in the local device to which the directory path found corresponds according to the search result comprises:

determining whether, in said directory residual database, there exists any identifier of another application program, other than said identifier, that corresponds to the directory path found;

if not, deleting the directory in the local device to which the directory path found corresponds;

if yes, determining whether, in the local device, there exists any application program to which the identifier of the another application program corresponds, and if no such application program exists, deleting the directory in the local device to which the directory path found corresponds.

Preferably, the step of deleting a directory in the local device to which the directory path found corresponds according to the search result comprises:

returning a prompting message of deleting the directory in the local device to which the directory path found corresponds to a user, so that the user can perform operations on the directory in the local device to which the directory path found corresponds according to the prompting message;

in the case that the user chooses to delete the directory in the local device to which the directory path found corresponds, deleting the directory in the local device to which the directory path found corresponds.

Preferably, the directory data further comprise directory level information, and the step of deleting a directory in the local device to which the directory path found corresponds according to the search result comprises:

returning the level information of the directory found to a user, so that the user can perform operations on the directory in the local device to which the directory path found corresponds according to the level information;

in the case that a user chooses to delete the directory in the local device to which the directory path found corresponds, deleting the directory in the local device to which the directory path found corresponds.

Preferably, the method further comprises:

in the case that, in the local pre-set directory residual database, there do not exist any directory data that correspond to the identifier of the target application program, sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

Preferably, the method further comprises:

receiving the search result returned by the server;

in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

receiving the directory path found and the identifiers of various application programs to which the path corresponds sent by the server;

determining, according to the received identifiers, whether, in the local device, there exists an application program to which any identifier, other than said identifier of the target application program, in the identifiers of the received various identifiers corresponds, and if no such application program exists, deleting the directory in the local device to which the directory path found corresponds.

Preferably, in the pre-set directory residual database of the server, there exist directory data that correspond to the identifier of the target application program. The method further comprises:

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Preferably, the method further comprises:

storing the received directory path and the identifiers of various application programs to which the path corresponds in a local pre-set directory residual database, and establishing the corresponding relationship between the identifiers of various application programs and the received directory path in the local pre-set directory residual database.

In order to achieve the above object, embodiments of the present application disclose an application program uninstallation method, which is to be applied to a server. The method comprises:

receiving an identifier of a target application program sent by an electronic device;

searching a pre-set directory residual database of the server to determine whether there exist any directory data that correspond to the identifier of the target application program;

if such directory data exist, searching the directory residual database to determine whether there exists any identifier of another application program, other than said identifier of the target application program, that corresponds to the directory path found;

if not, returning the directory path found to the electronic device, so that the electronic device can delete the directory in the electronic device to which the directory path found corresponds according to the directory path returned by the server;

if yes, sending the directory path found and the identifiers of various application programs to which the path corresponds to the electronic device, so that the electronic device can perform operations on the directories of the electronic device according to the received identifiers.

In order to achieve above object, embodiments of the present application disclose an application program uninstallation apparatus, which is to be applied to an electronic device. The apparatus comprises: an uninstallation instruction receiving module, a specific directory deletion module, an identifier extraction module, a first searching module and a first deletion module, the uninstallation instruction receiving module is used for receiving an uninstallation instruction for a target application program;

the specific directory deletion module is used for deleting a specific directory in the local device to which the target application program corresponds according to the uninstallation instruction received by the uninstallation instruction receiving module;

the identifier extraction module is used for extracting an identifier of the target application program;

the first searching module is used for searching a local pre-set directory residual database to determine whether there exist any directory data that correspond to the identifier, the directory data comprising at least a directory path;

the first deletion module is used for deleting a directory in the local device to which the directory path found corresponds in the case that the first searching module has found that there exist directory data that correspond to the identifier.

Preferably, the first searching module comprises a first determination sub-module and a first deletion sub-module, the first determination sub-module is used for determining whether, in the local device, there exists a directory to which the directory path found corresponds;

the first deletion sub-module is used for deleting the directory in the local device to which the directory path found corresponds in the case that the determination result of the first determination sub-module is positive.

Preferably, the first searching module comprises a second determination sub-module, a second deletion sub-module and a third deletion sub-module, the second determination sub-module is used for determining whether, in said directory residual database, there exists any identifier of another application program, other than said identifier, that corresponds to the directory path found;

the second deletion sub-module is used for deleting the directory in the local device to which the directory path found corresponds in the case that the determination result of the second determination sub-module is negative;

the third deletion sub-module is used for determining, in the case that the determination result of the second determination sub-module is positive, whether, in the local device, there exists any application program to which the identifier of the another application program corresponds, and if no such application program exists, deleting the directory in the local device to which the directory path found corresponds.

Preferably, the first searching module comprises a prompting message returning sub-module and a forth deletion sub-module, the prompting message returning sub-module is used for returning a prompting message of deleting a directory in the local device to which the directory path found corresponds to a user, so that the user can perform operations on the directory in the local device to which the directory path found corresponds according to the prompting message;

the forth deletion sub-module is used for, in the case that a user chooses to delete a directory in the local device to which the directory path found corresponds, deleting the directory in the local device to which the directory path found corresponds.

Preferably, the directory data further comprises directory level information, and the first searching module comprises a level information returning sub-module and a fifth deletion sub-module, the level information returning sub-module is used for returning the level information of the directory found to a user, so that the user can perform operations on the directory in the local device to which the directory path found corresponds according to the level information;

the fifth deletion sub-module is used for, in the case that a user chooses to delete the directory in the local device to which the directory path found corresponds, deleting the directory in the local device to which the directory path found corresponds.

Preferably, the apparatus further comprises an identifier sending module, the identifier sending module is used for, in the case that, in the local pre-set directory residual database, there do not exist any directory data that correspond to the identifier of the target application program, sending the identifier of the target application program to a server, so that the server can search, according to the identifier, a pre-set directory residual database of the server to determine whether there exist any directory data that correspond to the identifier of the target application program, and send the search result to said electronic device, so that the electronic device can delete a local directory of said electronic device according to the search result.

Preferably, the apparatus further comprises a search result receiving module, a returning instruction receiving module, a first identifier receiving module and a second deletion module, the search result receiving module is used for receiving the search result returned by the server;

the returning instruction receiving module is used for, in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

the first identifier receiving module is used for receiving the directory path found and the identifiers of various application programs that correspond to the path sent by the server;

the second deletion module is used for determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Preferably, in the pre-set directory residual database of the server, there exist directory data that correspond to the identifier of the target application program and the apparatus further comprises a second identifier receiving module and a third deletion module, the second identifier receiving module is used for receiving the directory path found and the identifiers of various application programs that correspond to the path sent by the server;

the third deletion module is used for determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Preferably, the apparatus further comprises an updating module, the updating module is used for storing the received directory path and the identifiers of various application programs to which the path corresponds in a local pre-set directory residual database, and establishing the corresponding relationship between the identifiers of various application programs and the received directory path in the local pre-set directory residual database.

In order to achieve above object, embodiments of the present application disclose an application program uninstallation apparatus, which is to be applied to a server. The apparatus comprises a third identifier receiving module, a second searching module, a third searching module, a path returning module and an identifier returning module, the third identifier receiving module is used for receiving an identifier of a target application program sent by an electronic device;

the second searching module is used for searching a pre-set directory residual database of the server to determine whether there exist any directory data that correspond to the identifier of the target application program;

the third searching module is used for searching said directory residual database to determine whether there exists an identifier of another application program, other than said identifier of the target application program, that corresponds to the directory path found, in the case that it is found by the second searching module that there exist directory data that correspond to the identifier of the target application program;

the path returning module is used for returning the directory path found to the electronic device in the case that the search result of the third searching module is negative, so that the electronic device can delete the directory in the electronic device to which the directory path found corresponds according to the directory path returned by the server;

the identifier returning module is used for sending the directory path found and the identifiers of various application programs to which the path corresponds to the electronic device in the case that the search result of the third searching module is positive, so that the electronic device can perform operations on the directories of the electronic device according to the received identifiers.

In order to achieve above object, embodiments of the present application also provide an electronic device, which comprises:

a processor, a memory, communication interfaces and communication bus;

the processor, the memory and the communication interfaces connecting to and communicating with each other via the communication bus;

the memory storing executable program codes;

the processor, by reading the executable program code stored in the memory, executing the program corresponding to the executable program codes, so as to perform any application program uninstallation method which is to be applied to an electronic device, provided by embodiments of the present application.

In order to achieve above object, embodiments of the present application also provide a storage medium, wherein the storage medium is used for storing an application program for executing any application program uninstallation method applicable to an electronic device, provided by embodiments of the present application.

In order to achieve above object, embodiments of the present application also provide an application program, wherein the application program is used for executing any application program uninstallation method applicable to an electronic device, provided by embodiments of the present application.

In order to achieve above object, embodiments of the present application also provide a server comprising:

a processor, a memory, communication interfaces and communication bus;

the processor, the memory and the communication interfaces connecting to and communicating with each other via the communication bus;

the memory storing executable program codes;

the processor, by reading the executable program code stored in the memory, executing the program corresponding to the executable program codes, so as to perform the application program uninstallation method which is to be applied to a server, provided by the embodiments of the present application.

In order to achieve above object, embodiments of the present application also provide a storage medium, wherein the storage medium is used for storing an application program for executing the application program uninstallation method which is to be applied to a server, provided by the embodiments of the present application.

In order to achieve above purpose, embodiments of the present application also provide an application program, wherein the application program is used for executing the application program uninstallation method which is to be applied to a server, provided by the embodiments of the present application.

It can be seen from above technical solutions that, embodiments of the present application provide an application program uninstallation method and apparatus, when deleting a specific directory that corresponds to an uninstalled application program, other directories, other than the specific directory, that correspond to the uninstalled application program are also deleted simultaneously, so that after the uninstallation of the application program is completed, file residue is avoided, and the occupation of the device storage space is reduced.

BRIEF DESCRIPTION OF THE DRAWINGS

In order to explain the technical solutions of embodiments of the present application or of the prior art, a brief introduction to the drawings required for describing the embodiments and prior art will be given. Obviously, the drawings described below are just for some embodiments of the present application and other drawings may be obtained by those of ordinary skill in the art without any creative effort based on theses drawings.

DETAILED DESCRIPTION OF THE INVENTION

Hereinafter, clear and complete description of the technical solutions of the present application will be given in combination of drawings of the present application. Obviously, the embodiments described is merely parts of the embodiments of the present application, instead of all the embodiments. Based on the embodiments of the present application, all the other embodiments obtained by those of ordinary skill in the art without any creative efforts belong to the protection scope of the present application.

It should be noted that, embodiments of the present application are preferably to be applied to a mobile electronic device, such as mobile electronic devices with the IOS (IOS is an operation system of handheld devices developed by Apple), the Android Operation System (Android system is an operation system based on Linux which is free and with open source codes), the Windows Phone Operation System (Windows Phone is a cell phone operation system issued by Microsoft Corporation). Certainly, the embodiments of the present application are also to be applied to a personal computer and other smart electronic devices, which will not be limited in the present application.

In the following, detailed description of the present application will be given by means of specific embodiments.

Figure 1:
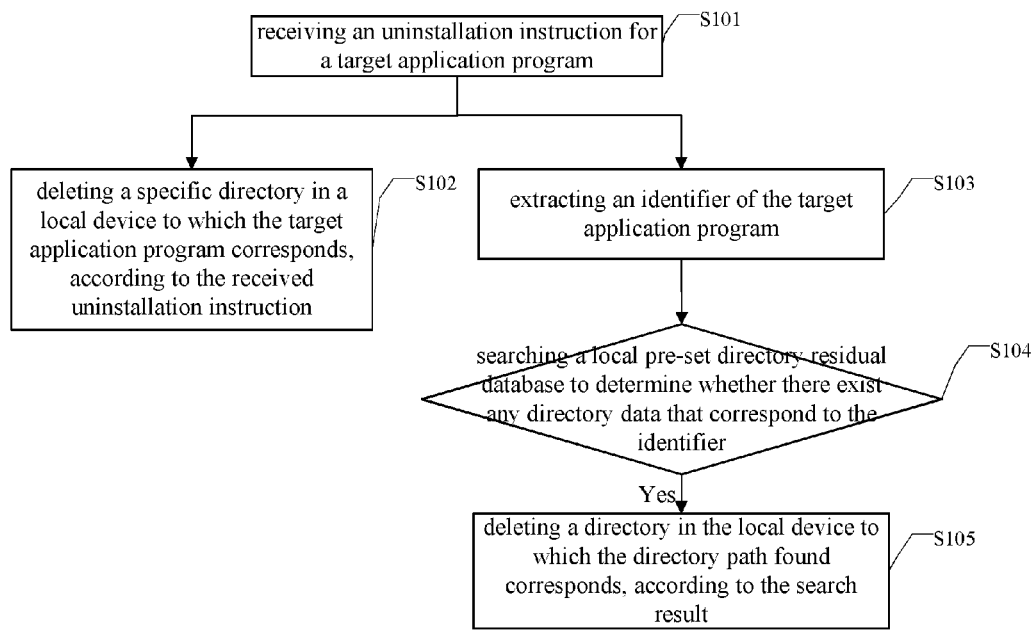
FIG. 1 is a first schematic flow chart of an application program uninstallation method which is to be applied to an electronic device, provided by embodiments of the present application.

FIG. 1 is a first schematic flow chart of an application program uninstallation method which is to be applied to an electronic device, provided by embodiments of the present application. The method may comprise:

S101: receiving an uninstallation instruction for a target application program;

S102: deleting a specific directory in a local device to which the target application program corresponds, according to the received uninstallation instruction;

S103: extracting an identifier of the target application program;

S104: searching a local pre-set directory residual database to determine whether there exist any directory data that correspond to the identifier, if such directory data exist, performing S105;

wherein the directory data comprise at least a directory path;

S105: deleting a directory in the local device to which the directory path found corresponds, according to the search result.

Assuming that the electronic device of the embodiments of the present application is a cell phone with Android Operation System and application programs such as the Kingsoft mobile security, the Cheetah browser, the Kingsoft mobile assistant, the Kingsoft Battery Doctor and the like are installed therein for example. When a user chooses to uninstall a certain application program, which is assumed to be the Kingsoft Battery Doctor for example, the cell phone receives an uninstallation instruction for the application program of the Kingsoft Battery Doctor, deletes the specific directory "sdcard/kbatterydoctor" in the cell phone to which the Kingsoft Battery Doctor corresponds and extracts the identifier of the application program of the Kingsoft Battery Doctor, wherein the identifier may be the ID or the name of the application program, and the present application will not limit the identifier of the target application program.

Assuming that the name of the application program is the identifier thereof, then "Kingsoft Battery Doctor" is extracted as the identifier of the application program of the Kingsoft Battery Doctor. Then, the local pre-set directory residual database of the cell phone is searched to determine whether there exist any directory path that corresponds to "Kingsoft Battery Doctor", for example, assuming that the local pre-set directory residual database of the cell phone is shown as table 1,

TABLE 1

| Identifier of an Application Program | Directory Path |
|---|---|
| Kingsoft Battery Doctor | sdcard/JSDownload |

If it is found that there exists a directory path that corresponds to the identifier "Kingsoft Battery Doctor", the directory sdcard/JSDownload in the cell phone is then deleted.

In practical application, before deleting a directory in the local device to which the directory path found corresponds according to the search result, it is possible to determine whether there exists a directory in the local device to which the directory path found corresponds; and if yes, then the directory in the local device to which the directory path found corresponds is deleted.

Specifically, the memory card of the cell phone is searched to determine whether there exists a JSDownload directory, and if the JSDownload directory exists, the JSDownload directory in the memory card of the cell phone is then deleted.

In practice application, a certain directory may be used by multiple application programs, therefore, in the case that the directory path found corresponds to an identifier of an uninstalled application program, it is also required to determine whether the directory path found corresponds to an identifier of another application program. Thus before deleting a directory in the local device to which the directory path found corresponds according to the search result, it is possible to determine whether, in said directory residual database, there exists any identifier of another application program, other than said identifier, that corresponds to the directory path found; if not, then the directory in the local device to which the directory path found corresponds is deleted; if yes, determining whether, in the local device, there exists any application program to which the identifier of the another application program corresponds, and if no such application program exists, then the directory in the local device to which the directory path found corresponds is deleted.

Specifically, if the local pre-set directory residual database of the cell phone is as shown in table 1, the directory path found "sdcarddSDownload" only corresponds to the identifier of "Kingsoft Battery Doctor", the directory of sdcard/JSDownload in the cell phone is then deleted.

If the local pre-set directory residual database of a cell phone is as shown in table 2:

TABLE 2

| Identifier of an Application Program | Directory Path |
|---|---|
| Kingsoft Battery Doctor | sdcard/JSDownload |
| Kingsoft Mobile Security | sdcard/JSDownload |

The directory path found "sdcard/JSDownload" corresponds to the identifier "Kingsoft Battery Doctor", and in the meanwhile it is found that the identifier "Kingsoft Mobile Security" corresponds to the directory path found "sdcard/JSDownload" as well, then it is required to further determine whether, in the cell phone, there exists an application program Kingsoft Mobile Security to which the identifier "Kingsoft Mobile Security" corresponds, and if the application program Kingsoft Mobile Security has been uninstalled before the uninstallation of the application program Kingsoft Battery Doctor, or if the application program Kingsoft Mobile Security has never been installed in the cell phone, then the directory sdcard/JSDownload in the cell phone is deleted. If the application program Kingsoft Mobile Security is still running in the cell phone and is not uninstalled, then the directory sdcard/JSDownload is not regarded as a residual directory and it will not be deleted.

In practical application, before deleting a directory in the local device to which the directory path found corresponds according to the search result, it is possible to return a prompting message of deleting the directory in the local device to which the directory path found corresponds to a user, so that the user can perform operations on the directory in the local device to which the directory path found corresponds according to the prompting message; in the case that the user chooses to delete the directory in the local device to which the directory path found corresponds, the directory in the local device to which the directory path found corresponds is deleted.

Specifically, when it is found that there exists a directory path that corresponds to the identifier of "Kingsoft Battery Doctor", it is possible to popup a prompting dialog box to inform the user that the directory JSDownload in the memory card of the cell phone may be a residual directory and to ask the user whether to delete it or not, in the case that the user chooses to delete it, the directory JSDownload in the memory card of the cell phone will be deleted.

In practical application, in the case that the directory data further comprise directory level information, before deleting the directory in the local device to which the directory path found corresponds according to the search result, it is possible to return the level information of the directory found to a user, so that the user can perform operations on the directory in the local device to which the directory path found corresponds according to the level information; in the case that a user chooses to delete the directory in the local device to which the directory path found corresponds, the directory in the local device to which the directory path found corresponds will be deleted.

Specifically, if the local pre-set directory residual database of a cell phone is as shown in table 3,

TABLE 3

| Identifier of an Application Program | Directory Path | Directory Level |
| --- | --- | --- |
| Kingsoft Battery Doctor | sdcard/JSKBDDownload | Suggest to delete |
| Kingsoft Mobile Security | sdcard/JSDBDownload | handle with caution |

When it is found that there exists a directory path that corresponds to the identifier "Kingsoft Battery Doctor" exists, it is possible to popup a prompting dialog box to inform the user that the directory JSKBDDownload in the memory card of the cell phone may be a residual directory and suggest the user to delete it, in the case that the user chooses to delete it, the directory JSKBDDownload in the memory card of the cell phone will be deleted.

When it is found that there exists a directory path that corresponds to the identifier "Kingsoft Mobile Security", it is possible to popup a prompting dialog box to inform the user that the directory JSDBDownload in the memory card of the cell phone may be a residual directory, and it is required to handle this directory with caution, in the case that the user chooses to delete it, the directory JSDBDownload in the memory card of the cell phone will be then deleted.

In the case that the directory data further comprises directory level information, the prompting message shown to the user comprises the level of the directory to be deleted. It is possible for the user to perform operations on the directory according to this prompting message selectively, for example, opening the directory to view the files in this directory, or copying the files in this directory and the like. Thus, it prevents the lost of important files.

By applying the embodiment shown in FIG. 1 of the present application, when deleting a specific directory that corresponds to an uninstalled application program, other directories, other than the specific directory, that correspond to the uninstalled application program are also deleted simultaneously, so that after the uninstallation of the application program is completed, file residual is avoided, and the occupation of the device storage space is reduced.

Figure 2:
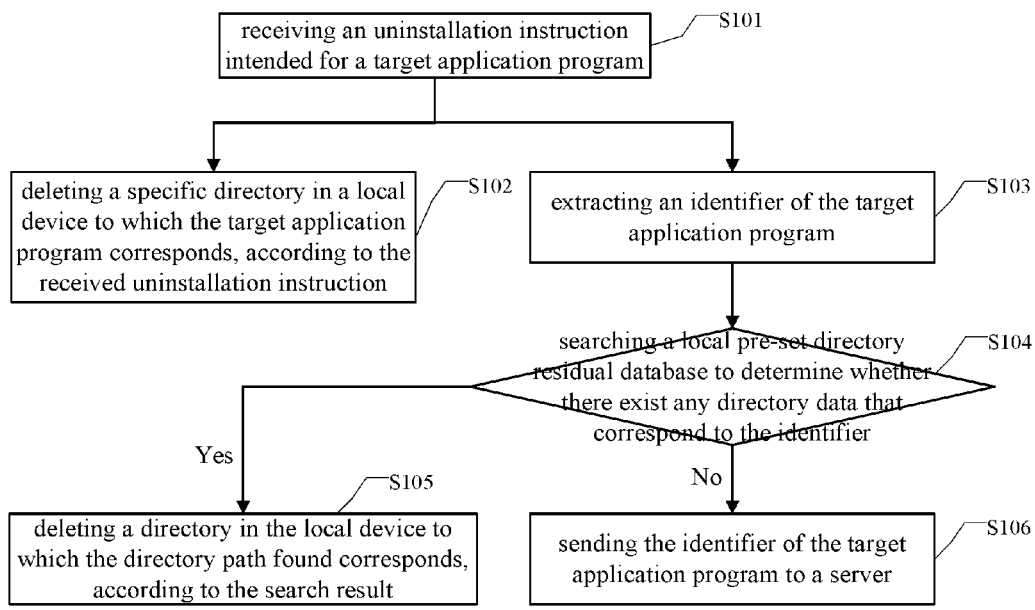
FIG. 2 is a second schematic flow chart of an application program uninstallation method which is to be applied to an electronic device, provided by embodiments of the present application.

Considering that in practical application, in a local pre-set directory residual database of an electronic device, there may not exist any directory data that correspond to the identifier of the uninstalled application program, thus embodiments of the present application further provide an application program uninstallation method, which is to be applied to an electronic device, referring to FIG. 2. Based on the embodiment shown FIG. 1, S106 is added in the embodiment shown in FIG. 2 of the present application, which is sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

In the case that, in the local pre-set directory residual database of the electronic device, there do not exist any directory data that correspond to the identifier of the uninstalled application program, that is when the determination result of S104 is negative, then S106 will be executed.

By applying the embodiment shown in FIG. 2 of the present application, in the case that, in the local pre-set directory residual database of the electronic device, there do not exist any directory data that correspond to the identifier of the uninstalled application program, it is also possible to send the identifier of the uninstalled application program to a server to perform the search, so that the electronic device can delete the local directory in the electronic device according to the search result of the server, so that after the uninstallation of the application program is completed, file residual is avoided, and the occupation of the device storage space is reduced.

Figure 3:
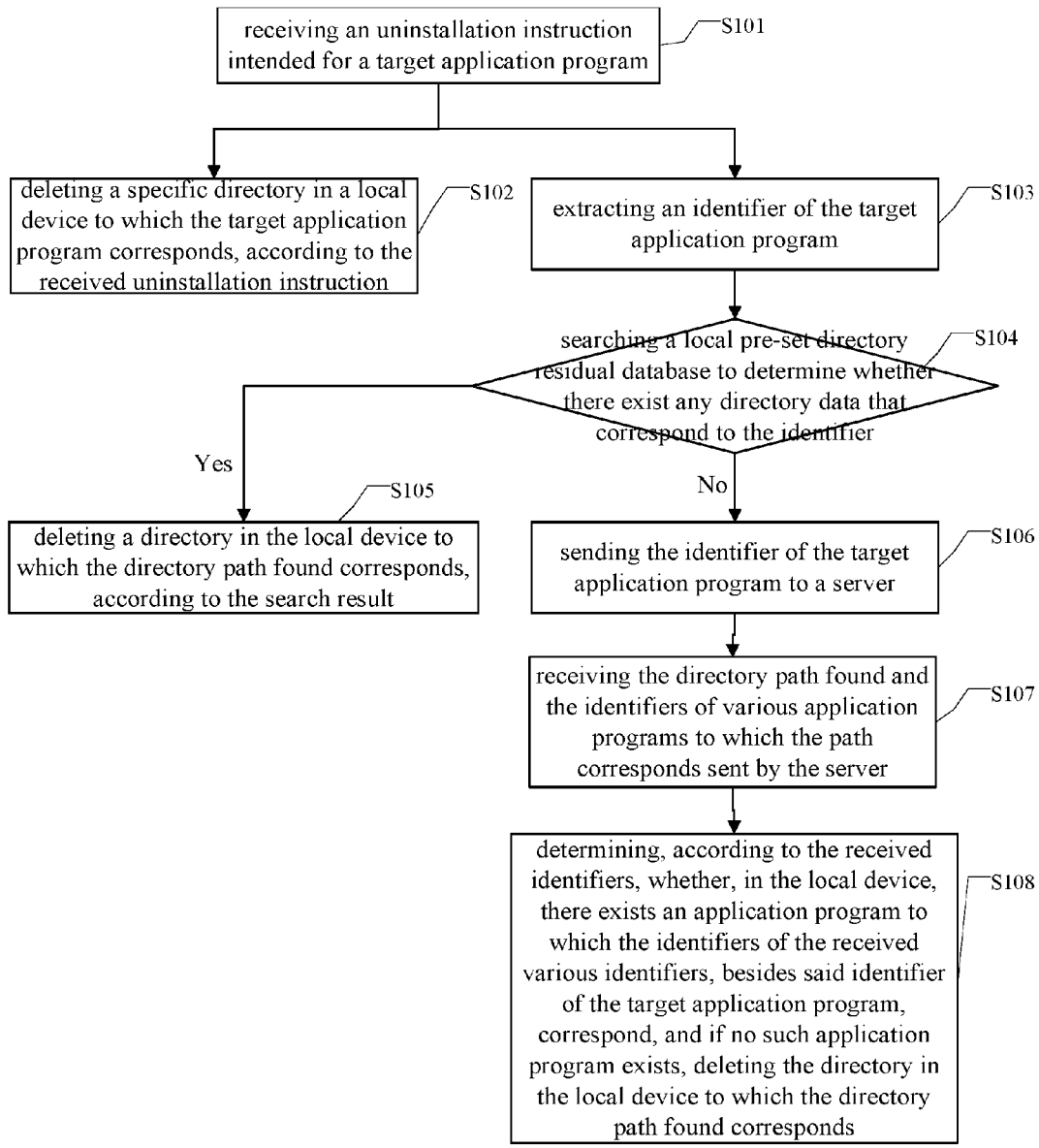
FIG. 3 is a third schematic flow chart of an application program uninstallation method which is to be applied to an electronic device, provided by embodiments of the present application.

FIG. 3 is a third schematic flow chart of an application program uninstallation method which is to be applied to an electronic device, provided by embodiments of the present application. The following two steps are added in the embodiment shown in FIG. 3 of the present application on the basis of the embodiment shown in FIG. 2:

S107: receiving the directory path found and the identifiers of various application programs to which the path corresponds sent by the server;

S108: determining, according to the received identifier, whether, in the local device, there exists an application program to which any identifier, other than said identifier of the target application program, in the identifiers of the received various identifiers corresponds, and if no such application program exists, deleting the directory in the local device to which the directory path found corresponds.

By way of example, assuming that the identifier of the target application program sent to the server is "Kingsoft Battery Doctor", the received directory path found sent by the sever is sdcard/JSDownload, and the identifiers that correspond to this path are respectively "Kingsoft Battery Doctor" and "Kingsoft Mobile Security". At this moment, it is required to further determine whether, in the cell phone, there exists the application program Kingsoft Mobile Security to which the identifier of "Kingsoft Mobile Security" corresponds, if the application program Kingsoft Mobile Security has been uninstalled before the uninstallation of the application program Kingsoft Battery Doctor, or if the application program Kingsoft Mobile Security has never been installed in the cell phone, then the directory sdcard/JSDownload in the cell phone is deleted. If the application program Kingsoft Mobile Security is still running in the cell phone and is not uninstalled, then the directory sdcard/JSDownload is not regarded as a residual directory and it will not be deleted.

By applying the embodiment shown in FIG. 3 of the present application, in the case that, in the local pre-set directory residual database of the electronic device, there do not exist any directory data that correspond to the identifier of the uninstalled application program, it is also possible to send the identifier of the uninstalled application program to a server to perform the search, so that the electronic device can delete the local directory in the electronic device according to the search result of the server, so that after the uninstallation of the application program is completed, file residual is avoided, and the occupation of the device storage space is reduced.

In the embodiment shown in FIG. 3, it is assumed by default that, in the pre-set directory residual database of the server, there exist directory data that correspond to the identifier of the target application program, and after the directory data has been found, the result is returned to the electronic device directly, without considering that, in the pre-set directory residual database of the server, there may not exist directory data that correspond to the identifier of the target application program. The present application further provides an application program uninstallation method which is to be applied to an electronic device, referring FIG. 4. Based on the embodiment shown in FIG. 3, the following two steps are added in the embodiment shown in FIG. 4:

S109: receiving the search result returned by the server;

S110: in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction.

Specifically, after sending the identifier of the uninstalled application program to the server, the search result returned by the server is received; if the search result returned by the server is that, in the local pre-set directory residual database, there do not exist any directory data that correspond to the identifier of the uninstalled application program, then the uninstallation of the application program is completed without any residual directory; if the search result returned by the server is that, in the local pre-set directory residual database, there exist directory data that correspond to the identifier of the uninstalled application program, then the electronic device sends, to the server, an instruction to return the directory path, so that the server can send the directory path found and the identifiers of various application programs to the electronic device corresponding to the instruction.

Figure 4:
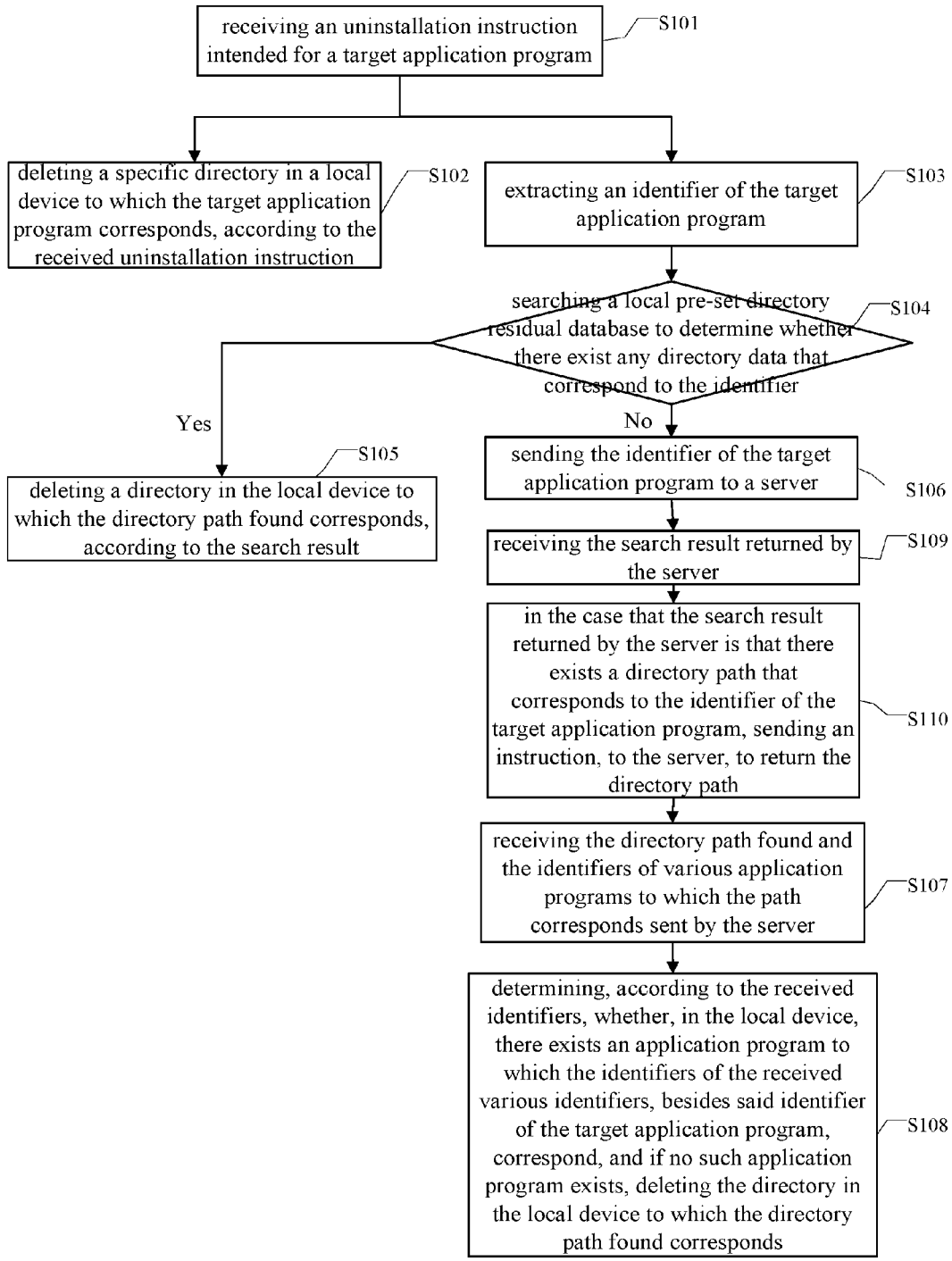
FIG. 4 is a forth schematic flow chart of an application program uninstallation method which is to be applied to an electronic device, provided by embodiments of the present application.

By applying the embodiment shown in FIG. 4, in the case that, in the local pre-set directory residual database in the electronic device, there do not exist any directory data that correspond to the identifier of the uninstalled application program, it is also possible to send the identifier of the uninstalled application program to the server to perform the search, so that the electronic device can delete the local directory in the electronic device according to the search result of the server, so that after the uninstallation of the application program is completed, file residual is avoided, and the occupation of the device storage space is reduced.

Figure 5:
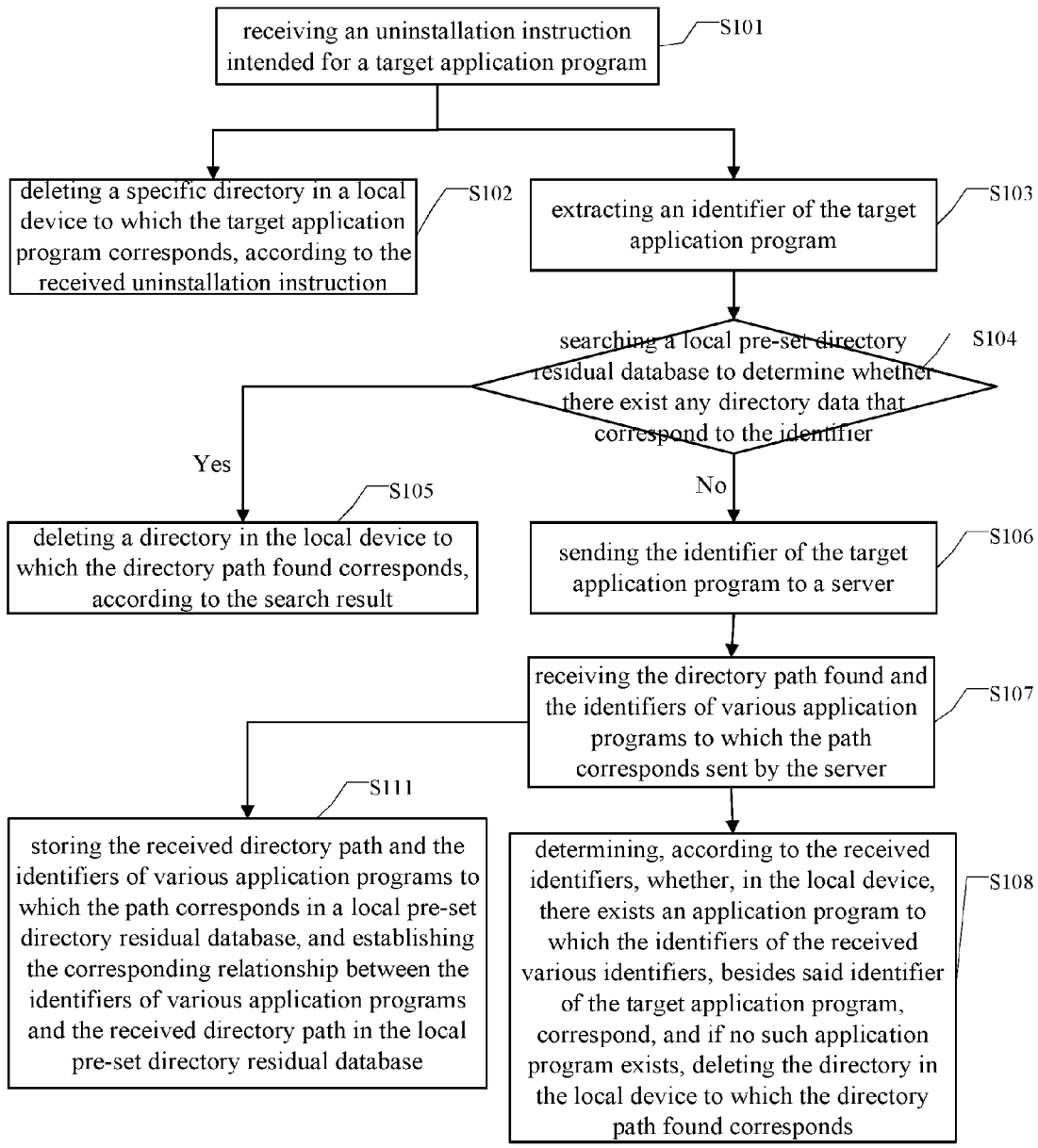
FIG. 5 is a fifth schematic flow chart of an application program uninstallation method which is to be applied to an electronic device, provided by embodiments of the present application.

Considering that in practical application, a user may uninstall an application program and then install this application program again, in order to avoid sending the identifier of this application program to the server when uninstalling it again, thereby avoiding the occupation of network resource and in order to improve the uninstallation efficiency, the present application further provides an application program uninstallation method, which is to be applied to an electronic device. Referring to FIG. 5, S111 is added in the embodiment shown in FIG. 5 of the present application on the basis of the embodiment shown in FIG. 3, which S111 is: storing the received directory path and the identifiers of various application programs to which the path corresponds in a local pre-set directory residual database, and establishing the corresponding relationship between the identifiers of various application programs and the received directory path in the local pre-set directory residual database.

S111 in the embodiments of the present application may also be added on the basis of the embodiment shown in FIG. 4.

Specifically, when it is found by the server that the directory path, to which the identifier "Kingsoft Battery Doctor" corresponds, is "sdcard/JSDownload", then storing the identifier "Kingsoft Battery Doctor" and the directory path "sdcard/JSDownload" in a local pre-set directory residual database, and establishing the corresponding relationship between the identifier and the directory path, which is shown in Table 4,

TABLE 4

| Identifier of an Application Program | Directory Path |
| --- | --- |
| Kingsoft Battery Doctor | sdcard/JSDownload |

By applying the embodiment shown in FIG. 5, sending the identifier of the application program to a server when uninstalling it again is avoided and thereby the occupation of network resource is avoided, and the uninstallation efficiency of application programs is improved.

Figure 6:
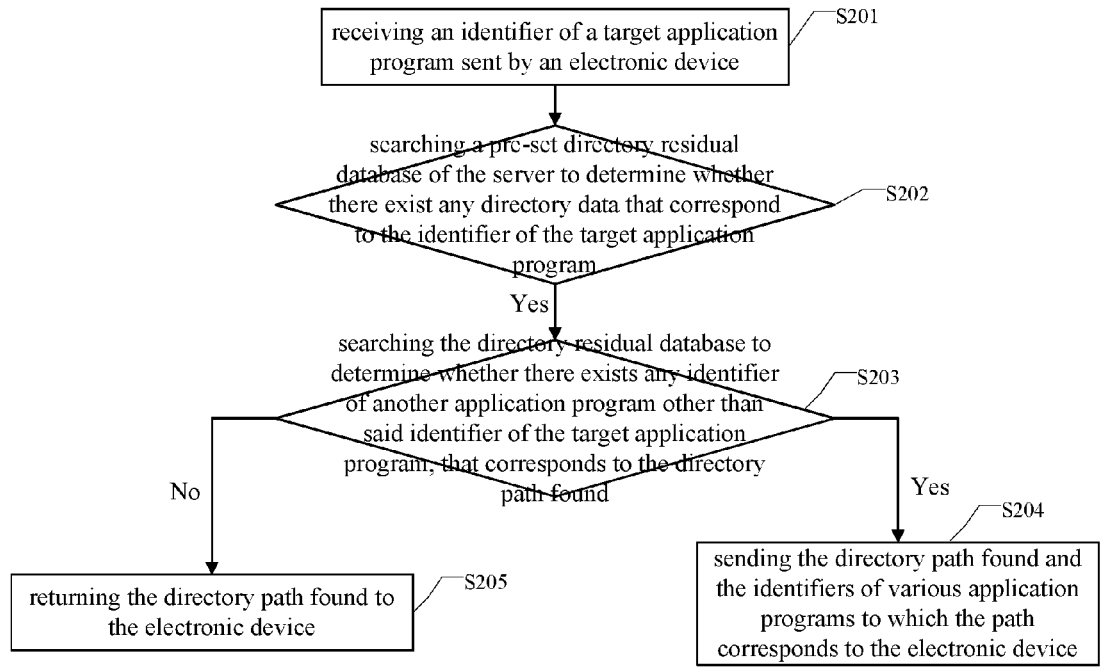
FIG. 6 is a schematic flow chart of an application program uninstallation method which is to be applied to a server, provided by embodiments of the present application.

FIG. 6 is a schematic flow chart of an application program uninstallation method which is to be applied to a server, provided by embodiments of the present application. The method may comprise:

S201: receiving an identifier of a target application program sent by an electronic device;

S202: searching a pre-set directory residual database of a server to determine whether directory data corresponding to the identifier of the target application program exists, if such directory data exist, performing S203;

S203: searching the directory residual database to determine whether there exists any identifier of another application program, other than said identifier of the target application program, that corresponds to the directory path found, if yes, performing S204, if not, performing S205;

S204: sending the directory path found and the identifiers of various application programs to which the path corresponds to the electronic device, so that the electronic device can perform operations on the directories of the electronic device according to the received identifiers;

S205: returning the directory path found to the electronic device, so that the electronic device can delete the directory in the electronic device to which the directory path found corresponds according to the directory path returned by the server.

By way of example, assuming that the received identifier of the target application program sent by the electronic device is "Kingsoft Battery Doctor", then the pre-set directory residual database of the server is searched to determine whether a directory path that corresponds to the Kingsoft Battery Doctor, for example, if the pre-set directory residual database of the server is as shown in Table 5:

TABLE 5

| Identifier of an Application Program | Directory Path |
| --- | --- |
| Kingsoft Battery Doctor | sdcard/JSDownload |
| Kingsoft Mobile Security | sdcard/JSDownload |

The directory path found "sdcard/JSDownload" corresponds to the identifier "Kingsoft Battery Doctor", in the meanwhile the identifier found "Kingsoft Mobile Security" corresponds to the directory path found "sdcard/JSDownload" as well, the directory path found "sdcard/JSDownload" and the identifiers "Kingsoft Battery Doctor" and "Kingsoft Mobile Security" to which the path corresponds are then sent to an electronic device respectively. After the electronic device receives the path and the identifiers sent by the server, it is possible to determine whether, in the electronic device, there exists the application program Kingsoft Mobile Security to which the identifier "Kingsoft Mobile Security", besides the identifier "Kingsoft Battery Doctor" corresponds. If the application program Kingsoft Mobile Security has been uninstalled before the uninstallation of the application program Kingsoft Battery Doctor, or the application program Kingsoft Mobile Security has never been installed in the electronic device, then the directory sdcard/JSDownload is deleted from the electronic device. If the application program Kingsoft Mobile Security is still running in the cell phone and is not uninstalled, then the directory sdcard/JSDownload is not regarded as a residual directory, and it will not be deleted.

If the pre-set directory residual database of the server is shown as in table 6:

TABLE 6

| Identifier of an Application Program | Directory Path |
|---|---|
| Kingsoft Battery Doctor | sdcard/JSDownload |

If the directory path found "sdcard/JSDownload" only corresponds to the identifier "Kingsoft Battery Doctor", the directory path found "sdcard/JSDownload" is then returned to the electronic device, and after the electronic device receives the path sent by the server, it is possible to delete the directory in the electronic device, to which the path corresponds.

By applying the embodiment shown in FIG. 6 of the present application, when deleting a specific directory to which an uninstalled application program corresponds, other directories, other than the specific directory, to which the uninstalled application program corresponds are deleted simultaneously, so that after the uninstallation of the application program is completed, file residual is avoided, and the occupation of the device storage space is reduced.

Corresponding to the above-mentioned embodiments of the method, embodiments of the present application further provide an application program uninstallation apparatus.

Figure 7:
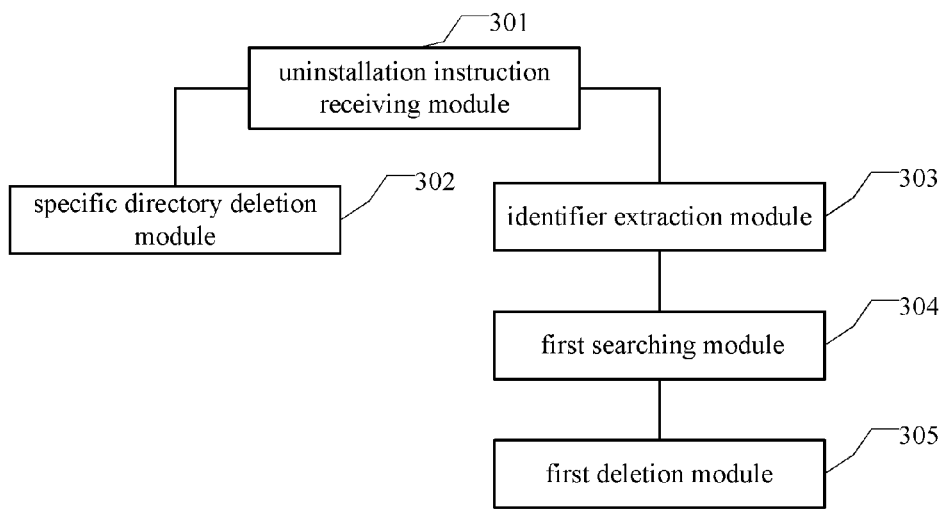
FIG. 7 is a first schematic structural view of an application program uninstallation apparatus which is to be applied to an electronic device, provided by embodiments of the present application.

FIG. 7 is a first schematic structural view of an application program uninstallation apparatus, which is to be applied to an electronic device. The apparatus may comprise: an uninstallation instruction receiving module 301, a specific directory deletion module 302, an identifier extraction module 303, a first searching module 304 and a first deletion module 305, wherein, the uninstallation instruction receiving module 301 is used for receiving an uninstallation instruction for a target application program;

the specific directory deletion module 302 is used for deleting a specific directory in the local device to which the target application program corresponds according to the uninstallation instruction received by the uninstallation instruction receiving module;

the identifier extraction module 303 is used for extracting an identifier of the target application program;

the first searching module 304 is used for searching a local pre-set directory residual database to determine whether there exist any directory data that correspond to the identifier, the directory data comprising at least a directory path;

the first searching module 304 in embodiments of the present application may comprise a first determination sub-module and a first deletion sub-module (not shown in the figure), wherein, the first determination sub-module is used for determining whether, in the local device, there exists a directory to which the directory path found corresponds;

the first deletion sub-module is used for deleting the directory in the local device to which the directory path found corresponds in the case that the determination result of the first determination sub-module is positive.

The first searching module 304 in the embodiments of the present application may comprise a second determination sub-module, a second deletion sub-module and a third deletion sub-module (not shown in the figure), wherein, the second determination sub-module is used for determining whether, in said directory residual database, there exists any identifier of another application program, other than said identifier, that corresponds to the directory path found;

the second deletion sub-module is used for deleting the directory in the local device to which the directory path found corresponds, in the case that the determination result of the second determination sub-module is negative;

the third deletion sub-module is used for determining, in the case that the determination result of the second determination sub-module is positive, whether, in the local device, there exists any application program to which the identifier of the another application program corresponds, and if no such application program exists, deleting the directory in the local device to which the directory path found corresponds.

The first searching module 304 in the embodiments of the present application may comprise a prompting message returning sub-module and a forth deletion sub-module (not shown in the figures), wherein, the prompting message returning sub-module is used for returning a prompting message of deleting a directory in the local device to which the directory path found corresponds to a user, so that the user can perform operations on the directory in the local device to which the directory path found corresponds according to the prompting message;

the forth deletion sub-module is used for, in the case that a user chooses to delete a directory in the local device to which the directory path found corresponds, deleting the directory in the local device to which the directory path found corresponds.

In the case that the directory data further comprises directory level information, the first searching module 304 in embodiments of the present application may comprise a level information returning sub-module and a fifth deletion sub-module (not shown in the figures), wherein, the level information returning sub-module is used for returning the level information of the directory found to a user, so that the user can perform operations on the directory in the local device to which the directory path found corresponds according to the level information;

the fifth deletion sub-module is used for, in the case that a user chooses to delete the directory in the local device to which the directory path found corresponds, deleting the directory in the local device to which the directory path found corresponds.

The first deletion module 305 is used for deleting a directory in the local device to which the directory path found corresponds in the case that the first searching module 304 has found that there exist directory data that correspond to the identifier.

By applying the embodiment shown in FIG. 7 of the present application, when deleting a specific directory that corresponds to an uninstalled application program, other directories, other than the specific directory, that correspond to the uninstalled application program are also deleted simultaneously, so that after the uninstallation of the application program is completed, file residual is avoided, and the occupation of the device storage space is reduced.

Figure 8:
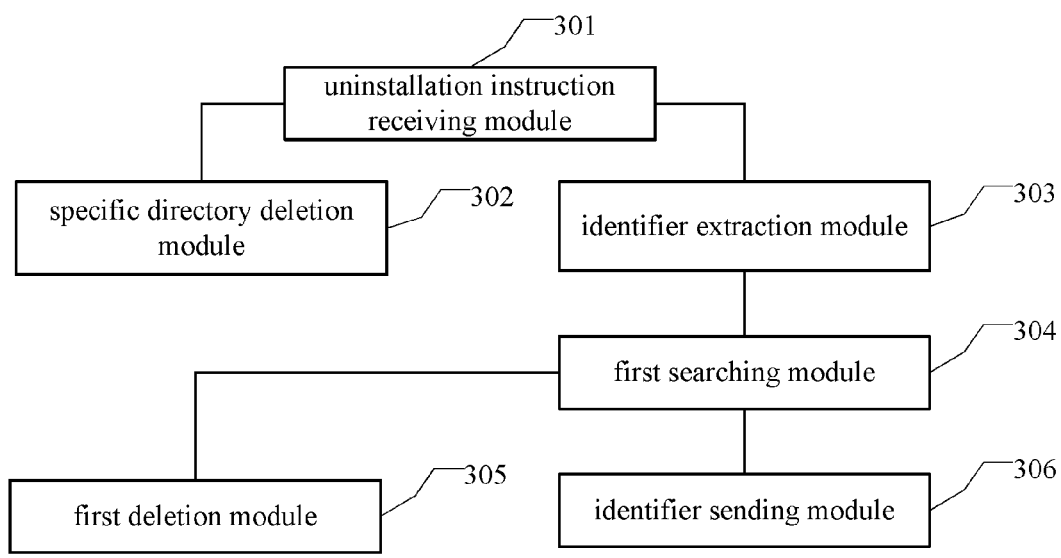
FIG. 8 is a second schematic structural view of an application program uninstallation apparatus which is to be applied to an electronic device, provided by embodiments of the present application.

FIG. 8 is a second schematic structural view of the application program uninstallation apparatus, which is to be applied to an electronic device, provided by the embodiments of the present application. An identifier sending module 306 is added in the embodiment shown in FIG. 8 of the present application on the basis of the embodiment shown in FIG. 7:

the identifier sending module 306 is used for, in the case that, in the local pre-set directory residual database, there do not exist any directory data that correspond to the identifier of the target application program, sending the identifier of the target application program to a server, so that the server can search, according to the identifier, a pre-set directory residual database of the server to determine whether there exist any directory data that correspond to the identifier of the target application program, and send the search result to said electronic device, so that the electronic device can delete a local directory of said electronic device according to the search result.

By applying the embodiment shown in FIG. 8 of the present application, even it is found that, in the local pre-set directory residual database of the electronic device, there exist no directory data that correspond to the identifier of the target application program, it is still possible to send the identifier of the target application program to a server, and to search the pre-set directory residual database of the server. When deleting a specific directory to which an uninstalled application program corresponds, other directories, other than the specific directory, to which the uninstalled application program correspond are also deleted simultaneously, so that after the uninstallation of the application program is completed, file residual is avoided, and the occupation of the device storage space is reduced.

Figure 9:
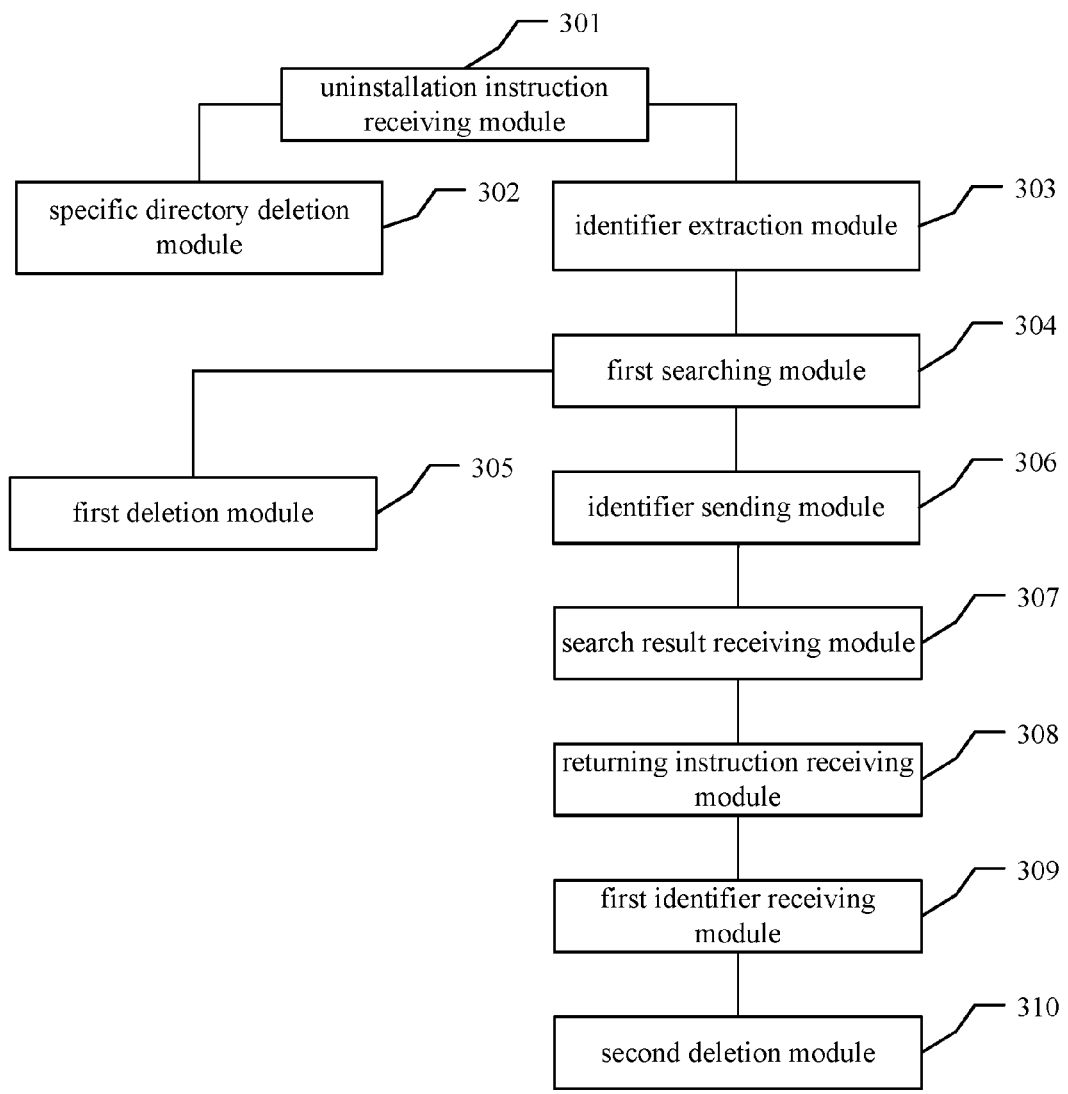
FIG. 9 is a third schematic structural view of an application program uninstallation apparatus which is to be applied to an electronic device, provided by embodiments of the present application.

FIG. 9 is a third schematic structural view of the application program uninstallation apparatus, which is to be applied to an electronic device, provided by the embodiments of the present application. On the basis of the embodiment shown in FIG. 8, a search result receiving module 307, a returning instruction receiving module 308, a first identifier receiving module 309 and a second deletion module 310 are added in the embodiment shown in FIG. 9 of the present application, wherein, the search result receiving module 307 is used for receiving the search result returned by a server;

the returning instruction receiving module 308 is used for, in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

the first identifier receiving module 309 is used for receiving the directory path found and the identifiers of various application programs that correspond to the path sent by the server;

the second deletion module 310 is used for determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

By applying the embodiment shown in FIG. 9 of the present application, even it is found that, in the local pre-set directory residual database of the electronic device, there exist no directory data that correspond to the identifier of the target application program, it is still possible to send the identifier of the target application program to a server, and to search the pre-set directory residual database of the server. When deleting a specific directory to which an uninstalled application program corresponds, other directories, other than the specific directory, to which the uninstalled application program correspond are also deleted simultaneously, so that after the uninstallation of the application program is completed, file residual is avoided, and the occupation of the device storage space is reduced.

Figure 10:
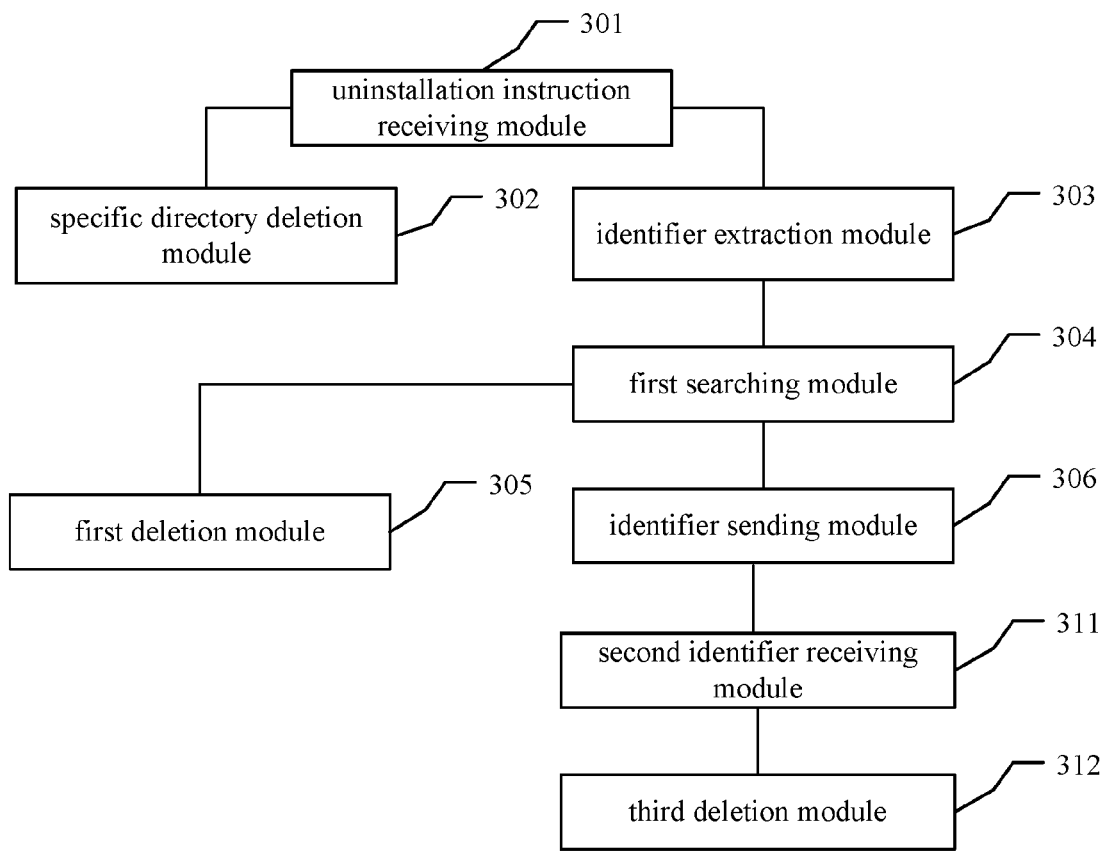
FIG. 10 is a forth schematic structural view of an application program uninstallation apparatus which is to be applied to an electronic device, provided by embodiments of the present application.

FIG. 10 is a forth schematic structural view of the application program uninstallation apparatus, which is to be applied to an electronic device, provided by the embodiments of the present application. On the basis of the embodiment shown in FIG. 8, a second identifier receiving module 311 and a third deletion module 312 are added in the embodiment shown in FIG. 10 of the present application, wherein, the second identifier receiving module 311 is used for receiving the directory path found and the identifiers of various application programs that correspond to the path sent by the server;

the third deletion module 312 is used for determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

By applying of the embodiment shown in FIG. 10 of the present application, even it is found that, in the local pre-set directory residual database of the electronic device, there exist no directory data that correspond to the identifier of the target application program, it is still possible to send the identifier of the target application program to a server, and to search the pre-set directory residual database of the server. When deleting a specific directory to which an uninstalled application program corresponds, other directories, other than the specific directory, to which the uninstalled application program correspond are also deleted simultaneously, so that after the uninstallation of the application program is completed, file residual is avoided, and the occupation of the device storage space is reduced.

Figure 11:
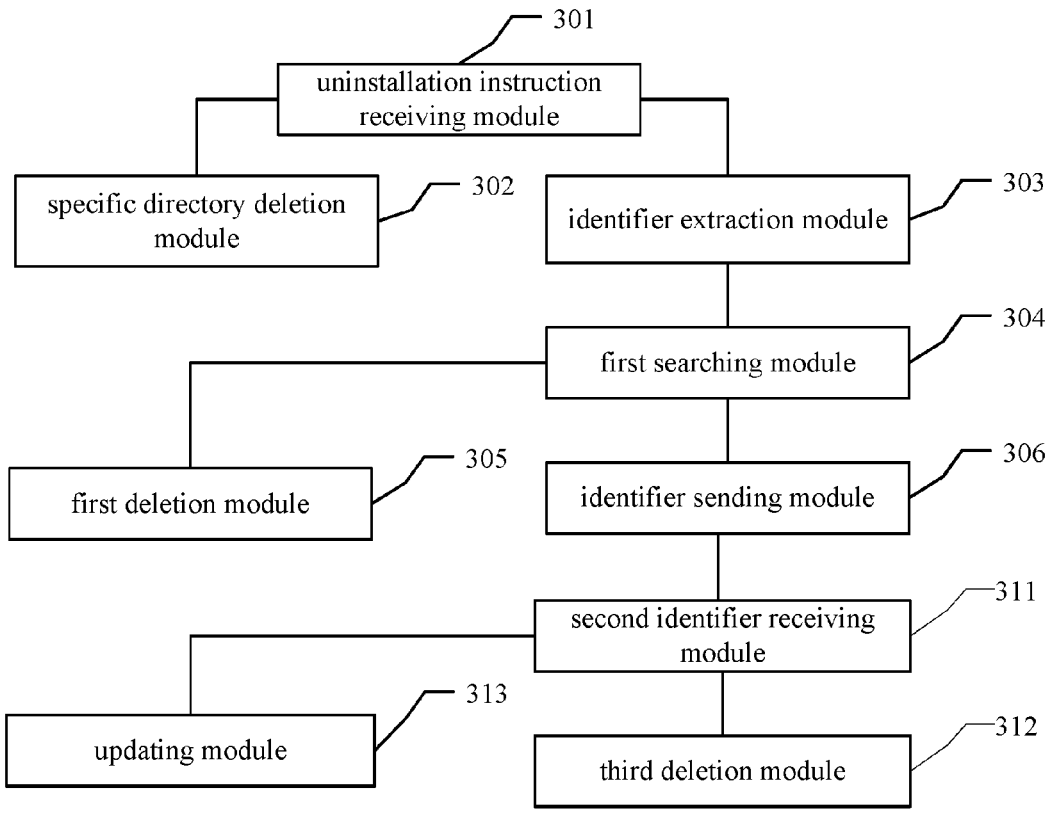
FIG. 11 is a fifth schematic structural view of an application program uninstallation apparatus which is to be applied to an electronic device, provided by embodiments of the present application.

FIG. 11 is a fifth schematic structural view of the application program uninstallation apparatus, which is to be applied to an electronic device, provided by the embodiments of the present application. On the basis of the embodiment shown in FIG. 10, an updating module 131 is added in the embodiment shown in FIG. 11 of the present application, wherein, the updating module 313 is used for storing the received directory path and the identifiers of various application programs to which the path corresponds in a local pre-set directory residual database, and establishing the corresponding relationship between the identifiers of various application programs and the received directory path in the local pre-set directory residual database.

In practice application, the updating module 313 can be added on the basis of embodiment shown in FIG. 9, and this module performs functional interaction with the first identifier receiving module 309 of FIG. 9.

By applying the embodiment shown in FIG. 11 of the present application, the local directory residual database of an electronic device is updated, which facilitates directory search by using the local directory residual database of the electronic device, thus improving directory search efficiency.

Figure 12:
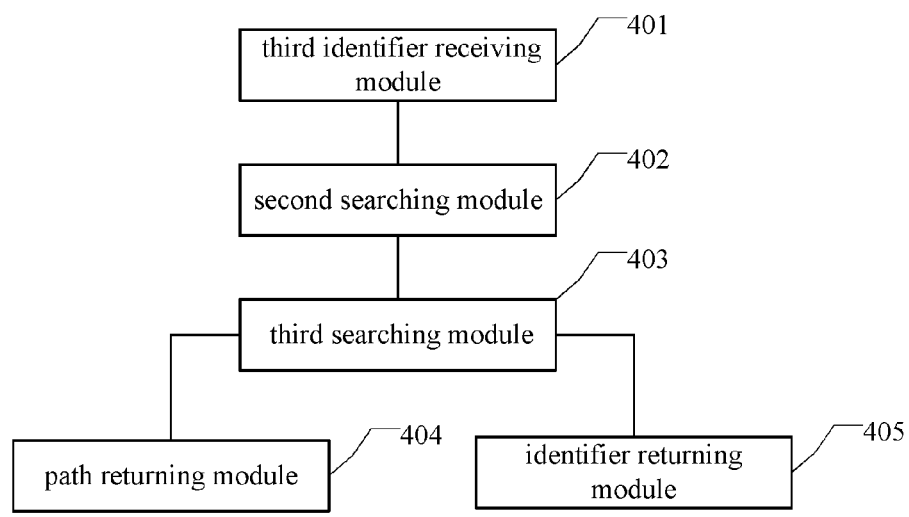
FIG. 12 is a schematic structural view of an application program uninstallation apparatus which is to be applied to a server, provided by embodiments of the present application.

FIG. 12 is a schematic structural view of the application program uninstallation apparatus, which is to be applied to a server, provided by embodiments of the present application. The apparatus comprises a third identifier receiving module 401, a second searching module 402, a third searching module 403, a path returning module 404 and an identifier returning module 405, wherein, the third identifier receiving module 401 is used for receiving an identifier of a target application program sent by an electronic device;

the second searching module 402 is used for searching a pre-set directory residual database of the server to determine whether there exist any directory data that correspond to the identifier of the target application program;

the third searching module 403 is used for searching said directory residual database to determine whether there exists an identifier of another application program, other than said identifier of the target application program, that corresponds to the directory path found, in the case that it is found by the second searching module 402 that there exist directory data that correspond to the identifier of the target application program;

the path returning module 404 is used for returning the directory path found to the electronic device in the case that the search result of the third searching module 403 is negative, so that the electronic device can delete the directory in the electronic device to which the directory path found corresponds according to the directory path returned by the server;

the identifier returning module 405 is used for sending the directory path found and the identifiers of various application programs to which the path corresponds to the electronic device in the case that the search result of the third searching module 403 is positive, so that the electronic device can perform operations on the directories of the electronic device according to the received identifiers.

By applying the embodiment shown in FIG. 12 of the present application, when it is found that, in the local directory residual database of the electronic device, there exist no directory data that correspond to the identifier of the uninstalled application program, it is still possible to search the target directory residual database of the server, and perform operations on the local directories of the electronic device according to the search results returned by the server. When deleting a specific directory to which an uninstalled application program corresponds, other directories, other than the specific directory, to which the uninstalled application program corresponds are also deleted simultaneously, so that after the uninstallation of the application program is completed, file residue is avoided, and the occupation of the device storage space is reduced.

Moreover, embodiments of the present application also provide an electronic device, which may comprise:

a processor, a memory, communication interfaces and communication bus;

the processor, the memory, and the communication interfaces connecting to and communicating with each other via the communication bus;

the memory storing executable program codes;

the processor, by reading the executable program code stored in the memory, executing the program to which the executable program codes correspond, so as to perform the application program uninstallation method that is to be applied to an electronic device provided by embodiments of the present application; wherein the application program uninstallation method that is to be applied to an electrical equipment provided by the embodiments of the present application may comprise:

receiving an uninstallation instruction for a target application program;

deleting a specific directory in a local device to which the target application program corresponds, according to the received uninstallation instruction;

extracting an identifier of the target application program;

searching a local pre-set directory residual database to determine whether there exist any directory data that correspond to the identifier, the directory data comprising at least a directory path;

if such directory data exist, deleting a directory in the local device to which the directory path found corresponds, according to the search result.

Wherein, the step of deleting a directory in the local device to which the directory path found corresponds according to the search result comprises:

determining whether there exists a directory in the local device to which the directory path found corresponds;

if yes, deleting the directory in the local device to which the directory path found corresponds.

Wherein, the step of deleting a directory in the local device to which the directory path found corresponds according to the search result comprises:

determining whether, in said directory residual database, there exists any identifier of another application program, other than said identifier, that corresponds to the directory path found;

if not, deleting the directory in the local device to which the directory path found corresponds;

if yes, determining whether, in the local device, there exists any application program to which the identifier of the another application program corresponds, and if no such application program exists, deleting the directory in the local device to which the directory path found corresponds.

Wherein, the step of deleting a directory in the local device to which the directory path found corresponds according to the search result comprises:

returning a prompting message of deleting the directory in the local device to which the directory path found corresponds to a user, so that the user can perform operations on the directory in the local device to which the directory path found corresponds according to the prompting message;

in the case that the user chooses to delete the directory in the local device to which the directory path found corresponds, deleting the directory in the local device to which the directory path found corresponds.

Wherein, the directory data further comprise directory level information, and the step of deleting a directory in the local device to which the directory path found corresponds according to the search result comprises:

returning the level information of the directory found to a user, so that the user can perform operations on the directory in the local device to which the directory path found corresponds according to the level information;

in the case that a user chooses to delete the directory in the local device to which the directory path found corresponds, deleting the directory in the local device to which the directory path found corresponds.

Wherein, the method further comprises:

in the case that, in the local pre-set directory residual database, there do not exist any directory data that correspond to the identifier of the target application program, sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

Wherein, the method further comprises:

receiving the search result returned by the server;

in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Wherein, in the pre-set directory residual database of the server, there exist directory data that correspond to the identifier of the target application program, and the method further comprises:

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds; and if no such application program exists, deleting the directory in the local device to which the directory path found corresponds.

Wherein, the method further comprises:

storing the received directory path and the identifiers of various application programs to which the path corresponds in a local pre-set directory residual database, and establishing the corresponding relationship between the identifiers of various application programs and the received directory path in the local pre-set directory residual database.

Moreover, embodiments of the present application further provide a storage medium, wherein the storage medium is used for storing an application program for executing the application program uninstallation method that is to be applied to an electronic device, provided by the embodiments of the present application; wherein the application program uninstallation method that is to be applied to an electronic device provided by the embodiments of the present application may comprise:

receiving an uninstallation instruction for a target application program;

deleting a specific directory in a local device to which the target application program corresponds, according to the received uninstallation instruction;

extracting an identifier of the target application program;

searching a local pre-set directory residual database to determine whether there exist any directory data that correspond to the identifier, the directory data comprising at least a directory path;

if such directory data exist, deleting a directory in the local device to which the directory path found corresponds, according to the search result.

Wherein, the step of deleting a directory in the local device to which the directory path found corresponds according to the search result comprises:

determining whether there exists a directory in the local device to which the directory path found corresponds;

if yes, deleting the directory in the local device to which the directory path found corresponds.

Wherein, the step of deleting a directory in the local device to which the directory path found corresponds according to the search result comprises:

determining whether, in said directory residual database, there exists any identifier of another application program, other than said identifier, that corresponds to the directory path found;

if not, deleting the directory in the local device to which the directory path found corresponds;

if yes, determining whether, in the local device, there exists any application program to which the identifier of the another application program corresponds, and if no such application program exists, deleting the directory in the local device to which the directory path found corresponds.

Wherein, the step of deleting a directory in the local device to which the directory path found corresponds according to the search result comprises:

returning a prompting message of deleting the directory in the local device to which the directory path found corresponds to a user, so that the user can perform operations on the directory in the local device to which the directory path found corresponds according to the prompting message;

in the case that the user chooses to delete the directory in the local device to which the directory path found corresponds, deleting the directory in the local device to which the directory path found corresponds.

Wherein, the directory data further comprise directory level information, and the step of deleting a directory in the local device to which the directory path found corresponds according to the search result comprises:

returning the level information of the directory found to a user, so that the user can perform operations on the directory in the local device to which the directory path found corresponds according to the level information;

in the case that a user chooses to delete the directory in the local device to which the directory path found corresponds, deleting the directory in the local device to which the directory path found corresponds.

Wherein, the method further comprises:

in the case that, in the local pre-set directory residual database, there do not exist any directory data that correspond to the identifier of the target application program, sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

Wherein, the method further comprises:

receiving the search result returned by the server;

in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Wherein, in the pre-set directory residual database of the server, there exist directory data that correspond to the identifier of the target application program, and the method further comprises:

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Wherein, the method further comprises:

storing the received directory path and the identifiers of various application programs to which the path corresponds in a local pre-set directory residual database, and establishing the corresponding relationship between the identifiers of various application programs and the received directory path in the local pre-set directory residual database.

Moreover, embodiments of the present application further provide an application program, wherein the application program is used for executing the application program uninstallation method that is to be applied to an electronic device, provided by the embodiments of the present application; wherein, the application program uninstallation method applicable to an electronic device, provided by the embodiments of the present application may comprise:

receiving an uninstallation instruction for a target application program;

deleting a specific directory in a local device to which the target application program corresponds, according to the received uninstallation instruction;

extracting an identifier of the target application program;

searching a local pre-set directory residual database to determine whether there exist any directory data that correspond to the identifier, the directory data comprising at least a directory path;

if such directory data exist, deleting a directory in the local device to which the directory path found corresponds, according to the search result.

Wherein, the step of deleting a directory in the local device to which the directory path found corresponds according to the search result comprises:

determining whether there exists a directory in the local device to which the directory path found corresponds;

if yes, deleting the directory in the local device to which the directory path found corresponds.

Wherein, the step of deleting a directory in the local device to which the directory path found corresponds according to the search result comprises:

determining whether, in said directory residual database, there exists any identifier of another application program, other than said identifier, that corresponds to the directory path found;

if not, deleting the directory in the local device to which the directory path found corresponds;

if yes, determining whether, in the local device, there exists any application program to which the identifier of the another application program corresponds, and if no such application program exists, deleting the directory in the local device to which the directory path found corresponds.

Wherein, the step of deleting a directory in the local device to which the directory path found corresponds according to the search result comprises:

returning a prompting message of deleting the directory in the local device to which the directory path found corresponds to a user, so that the user can perform operations on the directory in the local device to which the directory path found corresponds according to the prompting message;

in the case that the user chooses to delete the directory in the local device to which the directory path found corresponds, deleting the directory in the local device to which the directory path found corresponds.

Wherein, the directory data further comprise directory level information, and the step of deleting a directory in the local device to which the directory path found corresponds according to the search result comprises:

returning the level information of the directory found to a user, so that the user can perform operations on the directory in the local device to which the directory path found corresponds according to the level information;

in the case that a user chooses to delete the directory in the local device to which the directory path found corresponds, deleting the directory in the local device to which the directory path found corresponds.

Wherein, the method further comprises:

in the case that, in the local pre-set directory residual database, there do not exist any directory data that correspond to the identifier of the target application program, sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

Wherein, the method further comprises:

receiving the search result returned by the server;

in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Wherein, in the pre-set directory residual database of the server, there exist directory data that correspond to the identifier of the target application program, and the method further comprises:

receiving the directory path found and the identifiers of various application programs to which the path corresponds sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

Wherein, the method further comprises:

storing the received directory path and the identifiers of various application programs to which the path corresponds in a local pre-set directory residual database, and establishing the corresponding relationship between the identifiers of various application programs and the received directory path in the local pre-set directory residual database.

Moreover, embodiments of the present application also provide a server comprising:

a processor, a memory, communication interfaces and a communication bus;

the processor, the memory, and the communication interfaces connecting to and communicating with each other via the communication bus;

the memory storing executable program codes;

the processor, by reading the executable program code stored in the memory, executing the program corresponding to the executable program codes, so as to perform the application program uninstallation method that is to be applied to a server provided by the embodiments of the present application; wherein, the application program uninstallation method that is to be applied to a server provided by the embodiments of the present application may comprise:

receiving an identifier of a target application program sent by an electronic device;

searching a pre-set directory residual database of the server to determine whether there exist any directory data that correspond to the identifier of the target application program;

if such directory data exist, searching the directory residual database to determine whether there exists any identifier of another application program, other than said identifier of the target application program, that corresponds to the directory path found;

if not, returning the directory path found to the electronic device, so that the electronic device can delete the directory in the electronic device to which the directory path found corresponds according to the directory path returned by the server;

if yes, sending the directory path found and the identifiers of various application programs to which the path corresponds to the electronic device, so that the electronic device can perform operations on the directories of the electronic device according to the received identifiers.

Moreover, embodiments of the present application further provide a storage medium, wherein the storage medium is used for storing an application program for executing the application program uninstallation method that is to be applied to a server provided by the embodiments of the present application; wherein, the application program uninstallation method that is to be applied to a server provided by the embodiments of the present application may comprise:

receiving an identifier of a target application program sent by an electronic device;

searching a pre-set directory residual database of the server to determine whether there exist any directory data that correspond to the identifier of the target application program;

if such directory data exist, searching the directory residual database to determine whether there exists any identifier of another application program, other than said identifier of the target application program, that corresponds to the directory path found;

if not, returning the directory path found to the electronic device, so that the electronic device can delete the directory in the electronic device to which the directory path found corresponds according to the directory path returned by the server;

if yes, sending the directory path found and the identifiers of various application programs to which the path corresponds to the electronic device, so that the electronic device can perform operations on the directories of the electronic device according to the received identifiers.

Moreover, embodiments of the present application further provide an application program, wherein the application program is used for executing the application program uninstallation method that is to be applied to a server provided by the embodiments of the present application; wherein, the application program uninstallation method that is to be applied to a server provided by the embodiments of the present application may comprise:

receiving an identifier of a target application program sent by an electronic device;

searching a pre-set directory residual database of the server to determine whether there exist any directory data that correspond to the identifier of the target application program;

if such directory data exist, searching the directory residual database to determine whether there exists any identifier of another application program, other than said identifier of the target application program, that corresponds to the directory path found;

if not, returning the directory path found to the electronic device, so that the electronic device can delete the directory in the electronic device to which the directory path found corresponds according to the directory path returned by the server;

if yes, sending the directory path found and the identifiers of various application programs to which the path corresponds to the electronic device, so that the electronic device can perform operations on the directories of the electronic device according to the received identifiers.

Since the embodiments of the apparatus are basically similar to the embodiments of the method, the description thereof is then relatively simple, the relating parts of which could refer to the parts of the description of embodiments of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are to cover a non-exclusive inclusion, such that processes, methods, articles or mobile apparatuses comprising a series of elements comprise not only those elements listed, but also other elements not specifically listed or the elements intrinsic to these processes, methods, articles, or mobile apparatuses. Without further limitations, elements limited by sentences "comprise(s) a . . . " do not exclude that there are other identical elements in the processes, methods, objects, or mobile apparatuses which comprise these elements.

It should be understood for those ordinary skilled in the art that the realization of all or part of the steps of the above implementation can be achieved by instructing related hardware with a program, the program may be stored in a readable storage medium of a computer, wherein the storage medium is for example: a ROM/RAM, a magnetic disc, an optical disc etc.

Embodiments described above are just preferred embodiments of the present application, and not indented to limit the protection scope of the present application. Any modifications, equivalent replacements, improvements or the like within the spirit and principle of the present application fall within the protection scope of the present application.

The invention claimed is:

1. An application program uninstallation method, which is to be applied to an electronic device, characterized in that the method comprises:
   receiving an uninstallation instruction for a target application program;
   deleting a specific directory in a local device to which the target application program corresponds, according to the received uninstallation instruction;
   extracting an identifier of the target application program;
   searching a local pre-set directory residual database to determine whether there exist any directory data that correspond to the identifier, the directory data comprising at least a directory path;
   if yes, deleting a directory in the local device to which the directory path found corresponds, according to the search result,
   wherein the method further comprises:
   in the case that, in the local pre-set directory residual database, there do not exist any directory data that correspond to the identifier of the target application program, sending the identifier of the target application program to a server, so that the server can search a pre-set directory residual database of the server, according to the identifier, to determine whether there exist any directory data that correspond to the identifier of the target application program, and send the search result to said electronic device, so that the electronic device can delete a local directory in said electronic device according to the search result.

2. The method according to claim 1, characterized in that, the step of deleting a directory in the local device to which the directory path found corresponds according to the search result comprises:
   determining whether there exists a directory in the local device to which the directory path found corresponds;
   if yes, deleting the directory in the local device to which the directory path found corresponds.

3. The method according to claim 1, characterized in that, the step of deleting a directory in the local device to which the directory path found corresponds according to the search result comprises:
   determining whether, in said directory residual database, there exists any identifier of another application program, other than said identifier, that corresponds to the directory path found;
   if not, deleting the directory in the local device to which the directory path found corresponds;
   if yes, determining whether, in the local device, there exists any application program to which the identifier of the another application program corresponds, and if no such application program exists, deleting the directory in the local device to which the directory path found corresponds.

4. The method according to claim 1, characterized in that, the step of deleting a directory in the local device to which the directory path found corresponds according to the search result comprises:
   returning a prompting message of deleting the directory in the local device to which the directory path found corresponds to a user, so that the user can perform operations on the directory in the local device to which the directory path found corresponds according to the prompting message;
   in the case that the user chooses to delete the directory in the local device to which the directory path found corresponds, deleting the directory in the local device to which the directory path found corresponds.

5. The method according to claim 1, characterized in that, the directory data further comprise directory level information, and the step of deleting a directory in the local device to which the directory path found corresponds according to the search result comprises:
   returning the level information of the directory found to a user, so that the user can perform operations on the directory in the local device to which the directory path found corresponds according to the level information;
   in the case that a user chooses to delete the directory in the local device to which the directory path found corresponds, deleting the directory in the local device to which the directory path found corresponds.

6. The method according to claim 1, characterized in that, the method further comprises:
   receiving the search result returned by the server;
   in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;
   receiving the directory path found and the identifiers of various application programs to which the path corresponds sent by the server;
   determining, according to the received identifiers, whether, in the local device, there exists any application program to which any identifier, other than said identifier of the target application program, in the identifiers of the received various identifiers corresponds; and if no such application program exists, deleting the directory in the local device to which the directory path found corresponds.

7. The method according to claim 6, characterized in that, the method further comprises:
storing the received directory path and the identifiers of various application programs to which the path corresponds in a local pre-set directory residual database, and establishing the corresponding relationship between the identifiers of various application programs and the received directory path in the local pre-set directory residual database.

8. The method according to claim 1, characterized in that, in the pre-set directory residual database of the server, there exist directory data that correspond to the identifier of the target application program, and the method further comprises:
receiving the directory path found and the identifiers of various application programs to which the path corresponds sent by the server;
determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

9. An application program uninstallation method, which is to be applied to a server, characterized in that, the method comprises:
receiving an identifier of a target application program sent by an electronic device;
searching a pre-set directory residual database of the server to determine whether there exist any directory data that correspond to the identifier of the target application program, the directory data comprising at least a directory path;
if such directory data exist, searching the directory residual database to determine whether there exists any identifier of another application program, other than said identifier of the target application program, that corresponds to the directory path found;
if not, returning the directory path found to the electronic device, so that the electronic device can delete the directory in the electronic device to which the directory path found corresponds according to the directory path returned by the server;
if yes, sending the directory path found and the identifiers of various application programs to which the path corresponds to the electronic device, so that the electronic device can perform operations on the directories of the electronic device according to the received identifiers.

10. An electronic device, the electronic device comprises: a processor, a memory, communication interfaces and communication bus;
the processor, the memory, and the communication interfaces connecting to and communicating with each other via the communication bus;
the memory storing executable program codes;
the processor, by reading the executable program code stored in the memory, executing the program to which the executable program codes correspond, so as to perform the steps of:
receiving an uninstallation instruction for a target application program;
deleting a specific directory in a local device to which the target application program corresponds according to the uninstallation instruction;
extracting an identifier of the target application program;
searching a local pre-set directory residual database to determine whether there exist any directory data that correspond to the identifier, the directory data comprising at least a directory path;
if such directory data exist, deleting a directory in the local device to which the directory path found corresponds, according to the search result, wherein the processor of the electronic device further performs the steps of:
in the case that, in the local pre-set directory residual database, there do not exist any directory data that correspond to the identifier of the target application program, sending the identifier of the target application program to a server, so that the server can search, according to the identifier, a pre-set directory residual database of the server to determine whether there exist any directory data that correspond to the identifier of the target application program, and send the search result to said electronic device, so that the electronic device can delete a local directory of said electronic device according to the search result.

11. The electronic device according to claim 10, characterized in that, the step of deleting a directory in the local device to which the directory path found corresponds according to the search result comprises:
determining whether, in the local device, there exists a directory to which the directory path found corresponds;
if yes, deleting the directory in the local device to which the directory path found corresponds.

12. The electronic device according to claim 10, characterized in that, the step of deleting a directory in the local device to which the directory path found corresponds according to the search result comprises:
determining whether, in said directory residual database, there exists any identifier of another application program, other than said identifier, that corresponds to the directory path found;
if not, deleting the directory in the local device to which the directory path found corresponds;
if yes, determining whether, in the local device, there exists any application program to which the identifier of the another application program corresponds, and if no such application program exists, deleting the directory in the local device to which the directory path found corresponds.

13. The electronic device according to claim 10, characterized in that, the step of deleting a directory in the local device to which the directory path found corresponds according to the search result comprises:
returning a prompting message of deleting a directory in the local device to which the directory path found corresponds to a user, so that the user can perform operations on the directory in the local device to which the directory path found corresponds according to the prompting message;
in the case that a user chooses to delete a directory in the local device to which the directory path found corresponds, deleting the directory in the local device to which the directory path found corresponds.

14. The electronic device according to claim 10, characterized in that, the directory data further comprises directory level information, and the step of deleting a directory in the local device to which the directory path found corresponds according to the search result comprises:

returning the level information of the directory found to a user, so that the user can perform operations on the directory in the local device to which the directory path found corresponds according to the level information;

in the case that a user chooses to delete the directory in the local device to which the directory path found corresponds, deleting the directory in the local device to which the directory path found corresponds.

15. The electronic device according to claim 1, characterized in that, the processor of the electronic device further performs the steps of:

receiving the search result returned by the server;

in the case that the search result returned by the server is that there exists a directory path that corresponds to the identifier of the target application program, sending to the server an instruction of returning the directory path, so that the server can send the directory path found and the identifiers of various application programs to which the path corresponds to the electronic device according to the instruction;

receiving the directory path found and the identifiers of various application programs that correspond to the path sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

16. The electronic device according to claim 15, characterized in that the processor of the electronic device further performs the steps of:

storing the received directory path and the identifiers of various application programs to which the path corresponds in a local pre-set directory residual database, and establishing the corresponding relationship between the identifiers of various application programs and the received directory path in the local pre-set directory residual database.

17. The electronic device according to claim 1, characterized in that, in the pre-set directory residual database of the server, there exist directory data that correspond to the identifier of the target application program, and the processor of the electronic device further performs the steps of:

receiving the directory path found and the identifiers of various application programs that correspond to the path sent by the server;

determining, according to the received identifiers, whether, in the local device, there exists any application program to which any identifier, other than said identifier of the target application program, in the identifiers of the received various identifiers corresponds, and if no such application program exists, deleting the directory in the local device to which the directory path found corresponds.

18. A server, characterized in that the server comprises:

a processor, a memory, communication interfaces and a communication bus;

the processor, the memory, and the communication interfaces connecting to and communicating with each other via the communication bus;

the memory storing executable program codes;

the processor, by reading the executable program code stored in the memory, executing the program corresponding to the executable program codes, so as to perform the steps of:

receiving an identifier of a target application program sent by an electronic device;

searching a pre-set directory residual database of the server to determine whether there exist any directory data that correspond to the identifier of the target application program;

if such directory data exist, searching said directory residual database to determine whether there exists an identifier of another application program, other than said identifier of the target application program, that corresponds to the directory path found;

if not, returning the directory path found to the electronic device, so that the electronic device can delete the directory in the electronic device to which the directory path found corresponds according to the directory path returned by the server;

if yes, sending the directory path found and the identifiers of various application programs to which the path corresponds to the electronic device, so that the electronic device can perform operations on the directories of the electronic device according to the received identifiers.

* * * * *